US012632506B2

(12) United States Patent
Gasiorek et al.

(10) Patent No.: US 12,632,506 B2
(45) Date of Patent: May 19, 2026

(54) OFFLOADING SLAM PROCESSING TO A REMOTE DEVICE

(71) Applicant: Transition Technologies PSC S.A., Lodz (PL)

(72) Inventors: Adam Gasiorek, Lodz (PL); Marcin Koziak, Zgierz (PL); Marcin Sliwinski, Lodz (PL)

(73) Assignee: Transition Technologies PSC S.A., Lodz (PL)

( * ) Notice: Subject to any disclaimer, the term of this patent is extended or adjusted under 35 U.S.C. 154(b) by 270 days.

(21) Appl. No.: 18/533,705

(22) Filed: Dec. 8, 2023

(65) Prior Publication Data

US 2024/0193218 A1 Jun. 13, 2024

Related U.S. Application Data

(60) Provisional application No. 63/386,757, filed on Dec. 9, 2022.

(51) Int. Cl.
| | |
|---|---|
| *G06T 19/00* | (2011.01) |
| *G06F 16/954* | (2019.01) |
| *G06T 7/579* | (2017.01) |
| *G06T 7/70* | (2017.01) |

(52) U.S. Cl.
CPC ............ *G06F 16/954* (2019.01); *G06T 7/579* (2017.01); *G06T 7/70* (2017.01); *G06T 19/006* (2013.01); *G06T 2207/30244* (2013.01); *G06T 2219/004* (2013.01)

(58) Field of Classification Search
None
See application file for complete search history.

(56) References Cited

U.S. PATENT DOCUMENTS

| | | | | |
|---|---|---|---|---|
| 10,871,377 B1 * | 12/2020 | Yu | .......................... | G06T 19/003 |
| 12,353,646 B2 * | 7/2025 | Canberk | ............ | G02B 27/0176 |
| 12,455,619 B2 * | 10/2025 | Browy | .................... | G06V 20/20 |
| 2011/0102460 A1 * | 5/2011 | Parker | ................... | A63F 13/213 |
| | | | | 707/E17.044 |
| 2015/0350378 A1 * | 12/2015 | Hertel | ................... | G06F 16/583 |
| | | | | 709/203 |
| 2021/0390305 A1 * | 12/2021 | MacWilliams | .......... | G06N 3/02 |
| 2022/0398767 A1 * | 12/2022 | Zheng | .................... | G06V 10/25 |
| 2023/0009367 A1 * | 1/2023 | Goodman | ................. | G06T 7/73 |
| 2023/0031556 A1 * | 2/2023 | Huang | ...................... | G06T 7/11 |

OTHER PUBLICATIONS

First Look at the Future of Assisted Reality with RealWear Navigator TM 500,; dated Dec. 13, 2021; Accessed, Feb. 27, 2024; https://www.realwear.com/blog/first-look-at-the-future-of-assisted-reality-with-realwear-Navigator-500.

* cited by examiner

*Primary Examiner* — Robert J Craddock
(74) *Attorney, Agent, or Firm* — Young Basile Hanlon & MacFarlane, P.C.

(57) ABSTRACT

A request to add an overlay at a pixel located at (x, y) coordinates in images is received. Waypoints in a three-dimensional space are identified with respective two-dimensional projections onto the images falling inside a circle with a given radius r and centered at (x, y). An overlay z-coordinate is determined for the overlay as a weighted sum of respective z coordinates of the waypoints. The overlay is assigned a location (x, y, overlay z-coordinate).

20 Claims, 8 Drawing Sheets

400

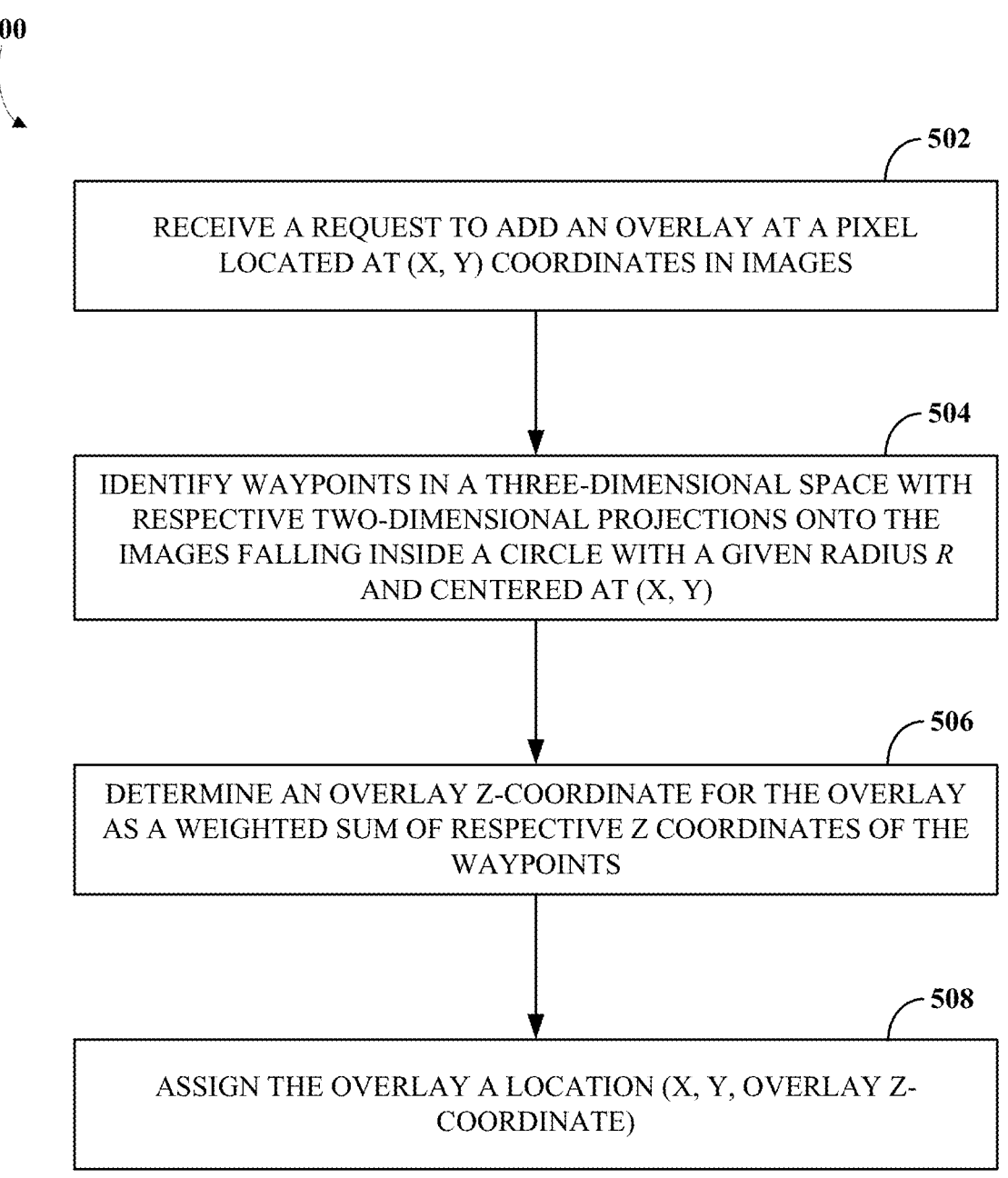

500

502

RECEIVE A REQUEST TO ADD AN OVERLAY AT A PIXEL LOCATED AT (X, Y) COORDINATES IN IMAGES

504

IDENTIFY WAYPOINTS IN A THREE-DIMENSIONAL SPACE WITH RESPECTIVE TWO-DIMENSIONAL PROJECTIONS ONTO THE IMAGES FALLING INSIDE A CIRCLE WITH A GIVEN RADIUS $R$ AND CENTERED AT (X, Y)

506

DETERMINE AN OVERLAY Z-COORDINATE FOR THE OVERLAY AS A WEIGHTED SUM OF RESPECTIVE Z COORDINATES OF THE WAYPOINTS

508

ASSIGN THE OVERLAY A LOCATION (X, Y, OVERLAY Z-COORDINATE)

FIG. 5

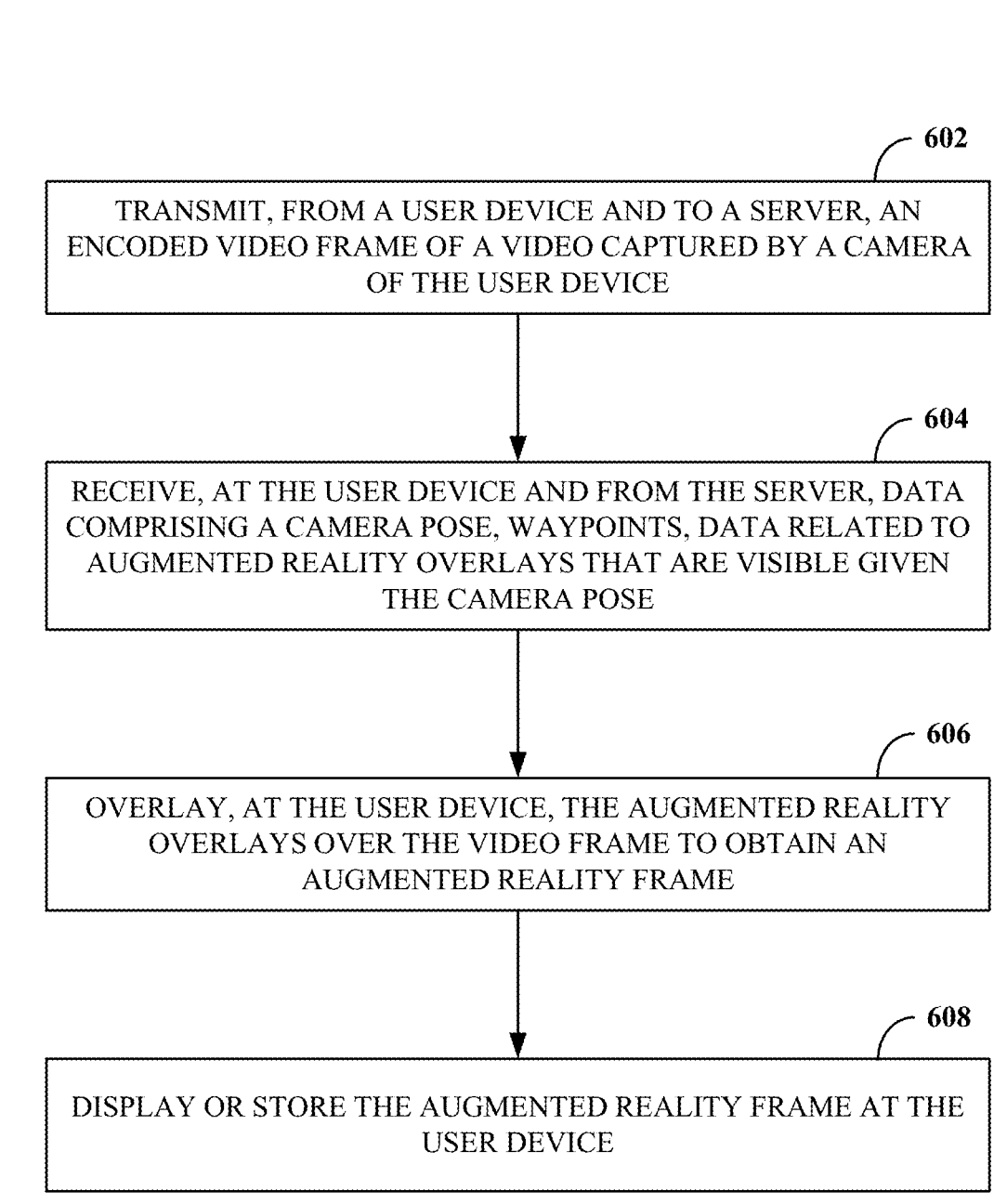

600

602

TRANSMIT, FROM A USER DEVICE AND TO A SERVER, AN ENCODED VIDEO FRAME OF A VIDEO CAPTURED BY A CAMERA OF THE USER DEVICE

604

RECEIVE, AT THE USER DEVICE AND FROM THE SERVER, DATA COMPRISING A CAMERA POSE, WAYPOINTS, DATA RELATED TO AUGMENTED REALITY OVERLAYS THAT ARE VISIBLE GIVEN THE CAMERA POSE

606

OVERLAY, AT THE USER DEVICE, THE AUGMENTED REALITY OVERLAYS OVER THE VIDEO FRAME TO OBTAIN AN AUGMENTED REALITY FRAME

608

DISPLAY OR STORE THE AUGMENTED REALITY FRAME AT THE USER DEVICE

FIG. 6

OFFLOADING SLAM PROCESSING TO A REMOTE DEVICE

CROSS-REFERENCE TO RELATED APPLICATION(S)

This application is a continuation of U.S. Patent Application Ser. No. 63/386,757, filed Dec. 9, 2022, the entire disclosure of which is hereby incorporated by reference.

TECHNICAL FIELD

This disclosure relates to simultaneous localization and mapping (SLAM) and more specifically to offloading Simultaneous Localization And Mapping (SLAM) processing to a remote device.

SUMMARY

A first aspect is a method comprising receiving a request to add an overlay at a pixel located at (x, y) coordinates in an image; identifying waypoints in a three-dimensional space with respective two-dimensional projections onto the image falling inside a circle with a given radius r and centered at (x, y); determining an overlay z-coordinate for the overlay as a weighted sum of respective z coordinates of the waypoints; and assigning the overlay a location (x, y, overlay z-coordinate) to the overlay.

A second aspect is a method comprising transmitting, from a user device and to a server, an encoded video frame of a video captured by a camera of the user device; receiving, at the user device and from the server, data comprising a camera pose, waypoints, data related to augmented reality overlays that are visible given the camera pose; overlaying, at the user device, the augmented reality overlays over the video frame to obtain an augmented reality frame or receiving an augmented reality frame from the server; and displaying or storing the augmented reality frame at the user device.

A third aspect is a system comprising: a device and a server. The device is configured to be worn by a user. The device is configured to: capture frames or images and transmit the frames or the images. The server is in communication with the device. The server comprises a processor configured to: receive the frames or the images; process the frames or the images to generate simultaneous location and mapping (SLAM) information related to the frames or the images; overlay augmented reality overlays over the frames or the images; and transmitting the overlays to the device to be displayed to the user.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 5 is a block diagram of an example an operation of applying SLAM.

FIG. 6 is a block diagram of an example of augmenting images.

DETAILED DESCRIPTION

Figure 1:
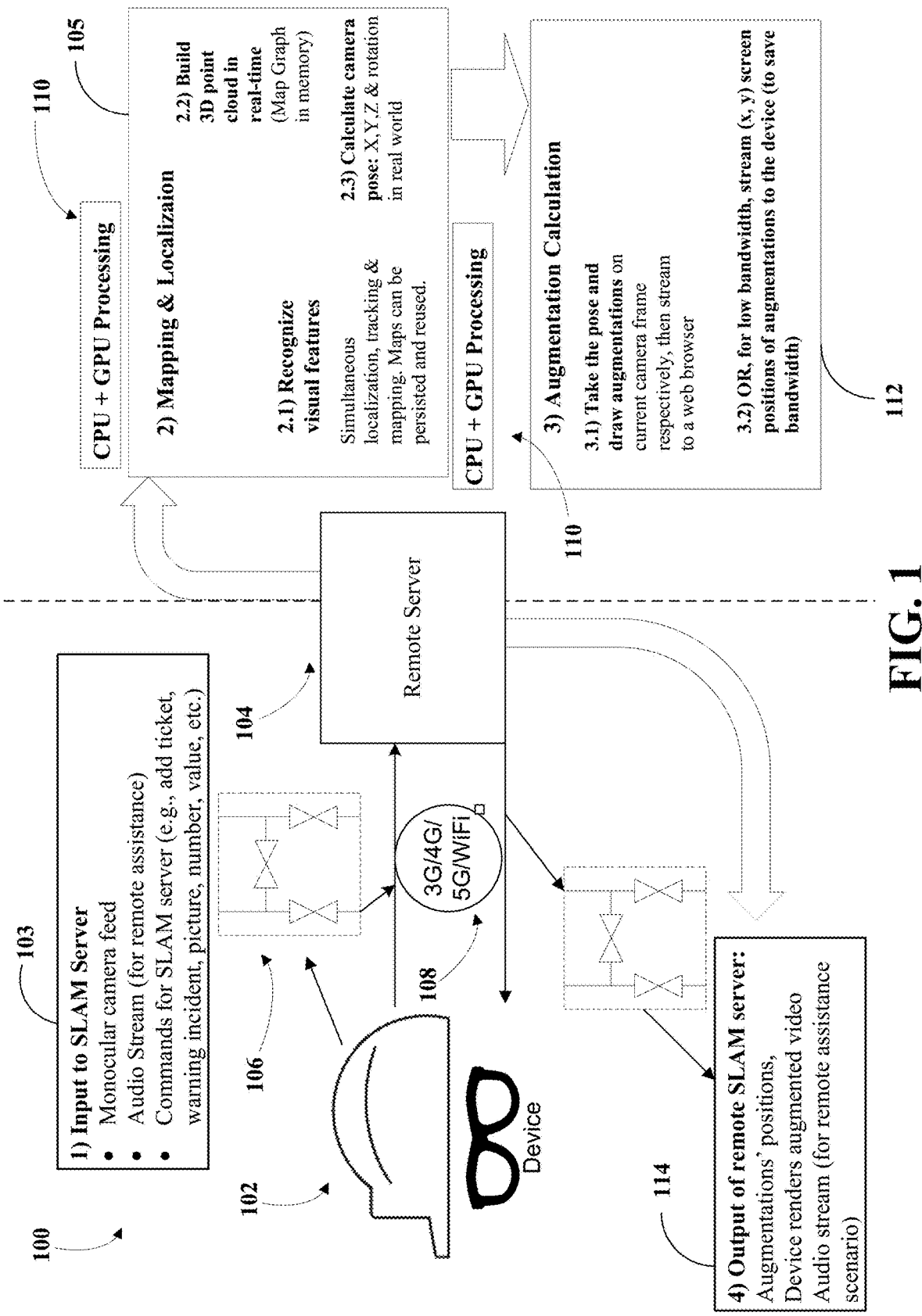
FIG. 1 is an example schematic of a process for offloading augmented reality (AR) and/or SLAM computations from a device to a remote server.

Described herein are techniques for offloading Simultaneous Localization And Mapping (SLAM) computations from low-end devices (referred to herein as client devices) to a remote server for augmented reality (AR) applications. The client devices may be monocular devices, which may be handheld or wearable devices. The client devices may be binocular devices, which may be handheld or wearable devices. The client devices are referred to herein as low-end devices because they may not natively include or provide AR or SLAM applications and/or even if so equipped, any such AR or SLAM capabilities are not used when such capabilities are provided via the remote server. SLAM computations enable the creation of a 3D map of an environment with associated information and the tracking of the position and orientation of the associated information and an AR device (such as monocular headset or handheld device) within this space.

A client device may include cameras, displays, or both. The client device may include one or more cameras and one or more displays. The cameras may be worn to cover at least one eye of the user such that the user views their surroundings through the images displayed on the display (e.g., screen). The client device may be handheld, and the images being captured may be viewed through the display. Thus, a user may turn on the client device and point one of the cameras at an area of interest so that information regarding the area of interest may be locally captured and gathered, remotely analyzed, and returned to the client device as processed information. The client device may be a non-AR device that is capable of communicating with a remote server, which returns SLAM information, configured to formatted for display on the client device. The processed information may be provided in combination with real time current information simultaneously. For example, the processed information may overlay actual information (e.g., images) being captured. The present teachings include a client device that is in communication with a remote server.

The remote server is configured to provide real-time AR capabilities. The remote server may be in communication with the client device. The remote server may be in wireless communication, a wired connection, or both with the client device. Information may be provided from a client device in real time to the remote server as the client device captures information (e.g., images). The remote server may process the information (e.g., to generate SLAM) and then return processed information in real time. The remote server may index the real world in a three-dimensional space. The real world may be a physical space such as a factory, production line, warehouse, refinery, shipyard, house, city area, production machines, agricultural machines, vehicles, their components, parts, systems, engines, electrical systems, or a combination thereof. An indexed space may include tags, may be searched, may be recorded, or a combination thereof. An indexed spaces may be stored such that when a user looks at the indexed space via a client device, tagged information may be provided as an AR overlay. Providing AR capabilities may include or require that the remote server provide SLAM capabilities. For example, the remote server may provide AR-as-a-service where the outputs of such services are manifested or displayed on the client devices.

The AR capabilities may be used, for example, to enrich the field of view of a user (e.g., a worker) who may be wearing or carrying the device, such as during collaborative or individual jobs performed in physical locations. In an example, a first client device may capture images of a region of interest and then the processed information may be provided to two or more client devices so that the two or more client devices are provided the same processed information. The processed information may be generated at a remote server that has processing capabilities that include SLAM capabilities.

By offloading SLAM capabilities to the remote server, low-end client device (e.g., devices that are not AR-capable) can receive spatial intelligence and display AR content without negatively impacting battery life at the device. Generally, AR-capable devices are high-energy use devices. However, the offloading capabilities described herein can prevent battery drain at the client devices because any SLAM computations are not performed onboard. Offloading SLAM may allow client devices to only include cameras and displays and little to no processing capabilities. The client devices may function without directly computing and processing any information. The client devices may capture information, disseminate the information, and receive information without processing or analyzing any of the information.

Offloading SLAM processing to a remote device provides many benefits including benefits related to visual-based search, visual positioning, hardware-agnostic AR, and high energy efficiency. Offloading SLAM may increase processing time as compared to processing performed by a processor located within a client device. For example, a remote device may include a faster processor than the client device itself such that the information can be transmitted, analyzed, and received faster than the information can be analyzed within the client device.

With respect to visual-based search, the techniques described herein can be used to index physical spaces (e.g., industrial facilities, commercial facilities, factories, production lines, warehouses, refineries, shipyards, houses, city areas, machines or vehicles or their components (e.g., internal components of a machine or vehicle) etc.) in 3-dimensions, tag those spaces, persist the spaces, and provide a real-time visual search/presentation engine based on a current camera frame, such as one recorded or captured using client devices. Consequently, when users subsequently view, via a user device, a physical object that was previously indexed/tagged, the information can pop up immediately as AR overlays (augmentations) whenever the physical object is in the field of view of the user device. The overlay may highlight changes between previous recordings and a current state of the object. The overlay may provide images of what the current state should be adapted to look like or how the current state should be adapted. Thus, an operator may be able to easily ascertain changes over time. The overlay may include texts, numbers, files (e.g., pictures, videos, documents), links, hyperlinks, interactive elements (i.e., data values from sensors), or a combination thereof. An operator may be able to track changes in an object over time to determine how to restore an object to a predetermined state, location, condition, or a combination thereof.

With respect to visual positioning, the techniques described herein can be used to calculate positions and orientations (such as those of the devices) using external computation resources (i.e., using the computational resources of the remote server instead of those of the client devices). Positions and orientations may be ascertained purely on a video processing basis (remote SLAM). In environments where obtaining Global Positioning System (GPS) locations is not possible, where GPS operation is difficult, or in situations where GPS can only provide a coarse location, the location/position (as well as location-based data considering this current location) of a user, an object, a region of interest, or a combination thereof can still be at least sufficiently accurately estimated on every device equipped with a camera and connectivity regardless of computing power (e.g., such as on devices with limited computational resources). The location may be calculated without a GPS location and the SLAM location may be calculated based upon previously indexed locations within a space. Thus, as the field of view of a client device pans over a tagged area or item, the location may be calculated.

With respect to hardware-agnostic AR, since the techniques described herein offload SLAM algorithms and calculations from client devices to a remote SLAM server (such as one deployed in the cloud or another network), AR can be provided on low-end devices (e.g., monocular devices) that can be connected (such as over a network) to the remote server (referred to herein also as a SLAM server) that includes, performs, and implements SLAM capabilities and calculations.

FIG. 1 is an example of a process 100 for offloading AR and/or SLAM computations from a device 102 (e.g., client device) to a remote server 104. The process 100 begins by gathering information, passing the information from the device 102 to the remote server 104 as an input 103 where the remote server 104 processes that information. The device 102 is connected to a remote server 104 so that real time data regarding an object of interest 106 is transmitted to the remote server 104 via a communication device 108. The device 102 may be or include a binocular device, a monocular device, a camera, a video camera, a still image camera, or a combination thereof. The device 102 may be or include a screen, display, microphone, speaker, or a combination thereof. The device 102 may be worn (e.g., on a hat, on a head, belt, shirt, chest, or a combination thereof). The device 102 may be worn and may have a portion that is moveable between a deployed position and a stored position. For example, the device may have a portion that is movable into a position where the device 102 may be viewed by a user and then moved to a position where the device is not in view of the user. In another example, the device 102 may be a hat with glasses and the glasses may be moved in front of at least one of a user's eyes (e.g., within a line of sight) and the out of a user's line of sight. The device 102 may be carried or hand-held. The device 102 may transmit (e.g., send and receive) an audio stream, a visual stream, or both in real time. The device 102 may be in communication with other devices such that feedback may be provided to a user of the device in real time. The device 102 may be integrated into another component. The device 102 may include or be connectable to a communication device 108.

The communication device 108 functions to send and receive information from the device 102, the remote server 104, or both. The communication device 108 may be a separate mechanism that is connectable to the device 102 and the remote server 104 so that information may be transmitted via the communication device 108. The communication device 108 may be integrated into the device 102. The communication device 108 may be a wired device that is external to but wiredly connected to the device 102. The communication device 108 may be a wireless device. The communication device 108 may include one of more of the following or other interfaces: a Bluetooth interface, a ZigBee interface, a Wi-Fi interface, an infrared link, a cellular link, a near field communications (NFC) link, or an Advanced Network Technology interoperability (ANT+) link, a 3G device, a 4G device, a 5G device, or a combination thereof. The communication device 108 may be used to transmit information between the device 102 and the remote server 104 in substantially real time.

The remote server 104 may be a centralized computer system with data processing capabilities. The remote server 104 may be a cloud-based device. The remote server 104 may be physically located on a site or location. The remote server 104 may be portable. The remote server 104 may be a laptop, server, hardware, or a combination thereof. The remote server 104 can be characterized as a versatile computing entity with substantial data processing capabilities. This remote server 104 may manifest in various forms: as a centralized computer system, a cloud-based computing resource, or a physical hardware unit situated at a specific site or location. The adaptability of the remote server 104 extends to its portability, allowing configurations such as a laptop, a standalone server, or other hardware forms, either individually or in combination. To optimize performance, the remote server 104 can be equipped with one or more processors 110. These processors may be architecturally designed to be larger and faster compared to the processors that are typically integrated within the device 102, thereby enhancing computational efficiency and capacity. The remote server 104 and the device 102 may transmit information related to one or more objects of interest 106 back and forth (e.g., an input 103). The remote server 104 may include one or more processors 110 that are configured to analyze information within an input 103 in real time. While not specifically shown, the remote server 104 can have a typical configuration including one or more memories, peripheral devices, and network interfaces.

The input 103 may include a feed from the device 102. The input 103 may include an audio stream. The input 103 may include commands directed to the server. The commands may include a ticket, a warning, pictures, numbers, values, or a combination thereof. The input 103 once at the process 100 may be processed such as by simultaneously mapping and localization (SLAM) 105. The one or more processors 110 of the remote server can be configured to execute instructions stored in the one or more memories to perform techniques described herein.

The processors 110 map the objects of interests. The processors 110 when generating SLAM 105 may create three-dimensional renderings of the one or more objects of interest 106. The processors 110 when generating SLAM 105 may capture images, videos, audio, or a combination thereof from multiple positions so that virtually every angle of the image of interest 106 may be captured, analyzed, or both. The processor 110 may create localized maps of objects of interests 106, track objects of interest 106, or both. The processor 110 may store maps so that the maps may be used at a later time or repeatedly. The processors 110 may build one or more three-dimensional maps, point cloud maps, map graphs, or a combination thereof (e.g., a virtual map) SLAM 105 in real time. Once the SLAM 105 information is generated the SLAM 105 may undergo augmentation calculations 112.

The augmentation calculations 112 function to overlay annotations over frames within an image stream. The augmentation calculation 112 (i.e., results thereof) may be streamed to a device or a web browser in real time. The processors 110 may calculate 112 a position of an object of interest, a user, other device, or a combination thereof within the one or more three-dimensional maps, point cloud maps, map graphs, or a combination thereof. The processor 110 may provide feedback to a user in real time, to guide the user within the real world via the virtual and/or augmented generated maps. The processors 110 may provide overlayed instructions to a user step by step by displaying images of items to be performed with respect to an object of interest based upon the augmentation calculations 112. The processors 110 may relay step by step instructions as the user works on an object of interest 106. The processors 110 (Computer Processing Unit (CPU) and Graphical Processing Unit (GPU)) may perform one or more augmentation calculations 112 regarding one or more images captured. As such, the instructions can be presented at the display of the client device, a remote device, or both as overlays on top of an image in an AR view.

Augmentation calculations 112 performed by the processors 110 may add augmentations to a captured image. The augmentations may illustrate differences between an image of an object of interest 106 and a desired condition, position, shape, location, or a combination thereof of the object of interest 106. To illustrate, a user tasked with repairing or maintaining an object may view the object with the device 102, which may stream images in the field of view to the remote server 104, which in turn and in real time may analyze at least some of the images via an augmentation calculation 112 and provide feedback regarding the object. The augmentation calculations 112 may determine an augmentation image or a processed image that may be overlayed on the device 102 over the object of interest 106. The processors 110 may annotate the images, work with a remoter user to annotate the images, or both. The processors 110 may stream the annotations in real time to the device 102, a web browser, or both. The processors 110 may additionally stream to a web browser so that remote users may access the information, annotations, images, or a combination thereof. The processors 110 may output processed images (e.g., augmented images) to the device 102 in real time so that the user can visualize changes to the object of interest as the object of interest 106 is changed over time.

The object of interest 106 may be any part of a facility, building, device, business, industry, or a combination thereof that may need inspection, maintenance, replacement, or a combination thereof. The object of interest 106 may be a machine, device, power system, control system, or part to be repaired, replaced, changed, adapted, cleaned, or a combination thereof. The object of interest 106 may be anything that may be subject to change by a user. The object of interest 106 may be viewed by a remote user in real time while a present user tends to the object of interest 106 while collaborating with the remote user.

Figure 3A:
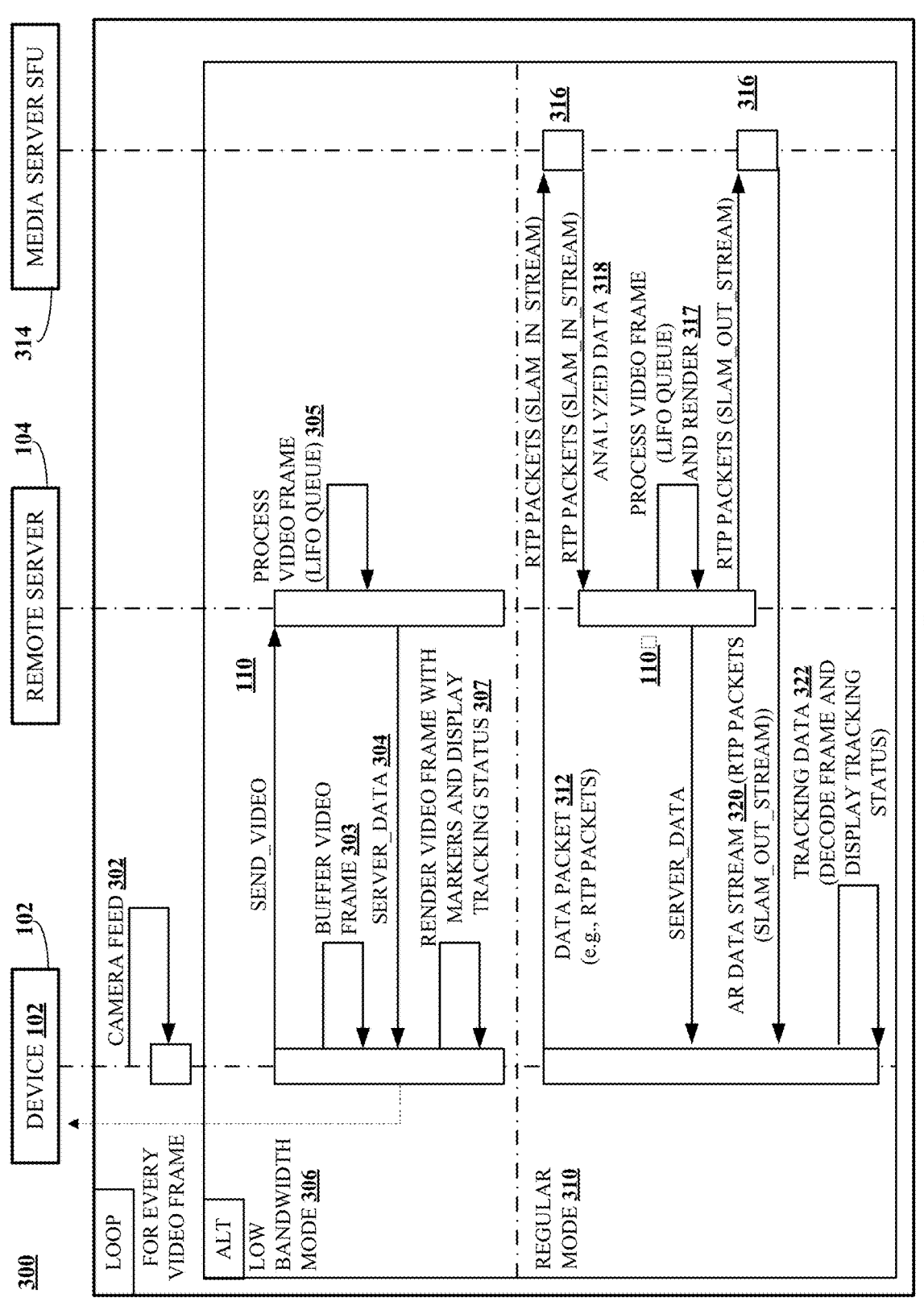
FIG. 3A is a sequence diagram of interactions between a monocular device and a SLAM server.

As such, results of the augmentation calculations 112 (i.e., output of remote SLAM server 114), which include positions of augmentations can be transmitted (e.g., streamed) to one or more devices in the form of augmented images or videos for display. The augmentation calculations 112 may be generated in one of two modes (e.g., limited bandwidth or regular conditions), which are illustrated in FIG. 3A. Additionally, audio streams may also be streamed, such as in the case of remote assistance cases, and as described elsewhere herein.

Figure 2A:
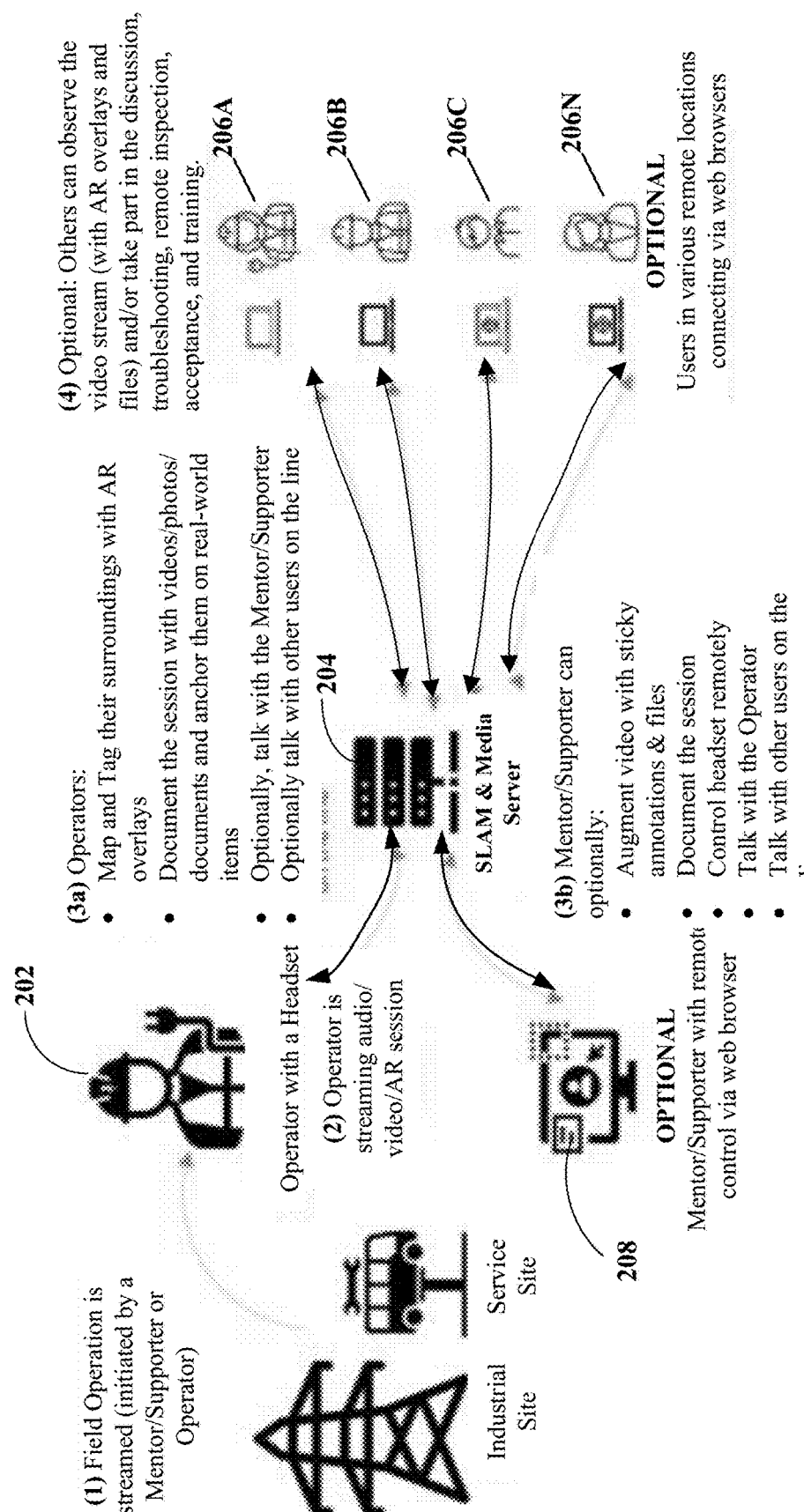
FIG. 2A illustrates an example of a use case for offloading AR and/or SLAM computations from a device to a remote server.

FIG. 2A illustrates an example of a use case 200 for offloading computations (e.g., AR and/or SLAM) from a device 202 of a worker to a remote server 204. The worker and corresponding device 202 may generally be located in a remote location such a field operation (e.g., an industrial site or a service site). The use case 200 illustrates that offloading processing (e.g., SLAM processing) to a remote server 204 from the device 202 of the worker, which increases speed of an operation. The device 202 of the worker can be used for individual jobs and collaborative sessions where the worker, equipped with a device (e.g., a monocular device), is at a physical location that can be imaged via the device 202 of the worker. The device 202 of the worker streams the image, audio, other information, or a combination thereof in real time to the remote server 204.

Images of the physical location can be transferred to a remote server 204 (e.g., a SLAM and Media Server). One or more other users 206A, 206B, 206C, . . . , 206N can observe a video stream received from the device 202 that is received by the remote server 204 and then transmitted with augmented overlays to respective devices of the users 206A-206N. During a collaboration session, a remote user (e.g., at least one of the users 206A-206N) can see and anchor AR overlays using the web browser front-end described with respect to FIG. 2B. The augmentations and/or overlays may be viewed by one or more remote users via a remote sharing device (e.g., a web based or cloud-based device). The remote sharing device may allow mentors, trainers, supports, or a combination thereof to provide augmentation and/or annotations in real time. The remote users may view the same images as the workers. The remote sharing device may be in communication with remote device 208 of a remote user. The remote device 208 may be a computer, tablet, smart phone, any device that is capable of connecting to the internet, or a combination thereof. The remote device 208 may provide real time support as the remote users generate annotations or augmentation.

The remote server 204 may record the sessions in real time so that the sessions may be replayed at a later time. The remote server 204 may allow users to communicate to one another in real time. The remote server 204 may allow a remote user to communicate with one or more local users 206A-206N in real time. The remote server 204 may perform any of the functions discussed herein. The remote server 204 functions to connect two or more groups of individuals together or even three or more groups of individuals together in a collaborative session from different locations. For example, the remote server 204 may transmit information between a main worker, other users 206A-206N, and even to remote devices controlled by remote users such as a mentor, supervisor, support, trainer, or a combination thereof.

The remote server 204 functions to enable any individual connected to the remote server 204 to provide feedback that is then conveyed (e.g., transmitted) to the device 202 of the worker so that the worker may perform a desired task. The other users 206A-206N may enable other workers to view an object of interest and provide feedback to the worker on site so that the worker on site may resolve an issue without other users 206A-206N having to travel to the site.

The worker and device 202 in conjunction with the remote server 204 generates maps, tags, or both related to surroundings of the worker and device 202. These maps, tags, or both may be annotated and/or overlayed with AR information. The images capture by the worker and device 202 may be documented, connected to videos, connected to photos, overlayed with videos, overlayed with photos, or a combination thereof. For example, a broken part may be overlayed with a picture or video of a new part so that the worker wearing the device 202 can see what the new part looks like. The worker and device 202 may talk with a mentor, supporter, other users, or a combination thereof in real time so that audio may be provided in addition to the information being overlayed. An audio tag explaining an overlay may also be added. The worker and device 202 (e.g., operator) may permit partial or full control to be provided by a mentor or supporter.

The mentor or supporter may augment videos, images, or both by adding files, tags, annotations, notes, drawings, audio, or a combination thereof. The augmentations may be provided in real time and may be documented. The operator (worker) may anchor the augmentations using the device 202. The mentor or supporter may control all or a portion of the device 202 such as audio and video. The supporter may communicate verbally with the worker and device 202. The supporter may add, subtract, discuss, or a combination thereof with other users connected to the device 202 and/or remote server 204.

Other workers or operators may connect to the device 202, the remote server 204 or both to participate. The other workers may provide annotations, audio, or both. The other workers may participate in discussions, troubleshooting, remote inspection, acceptance, training, or a combination thereof. The other workers may connect with the device through one or more web browsers.

Figure 2B:
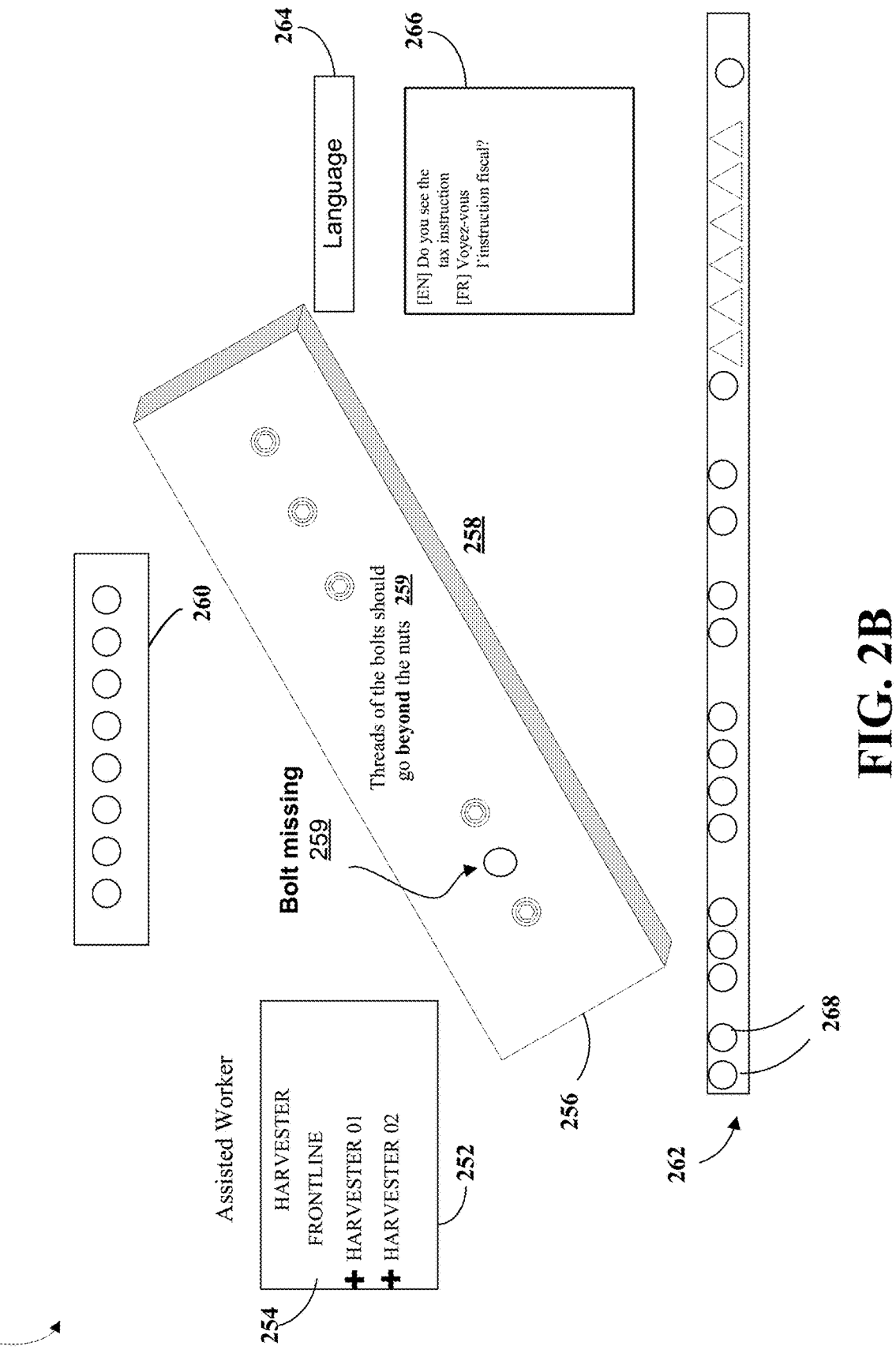
FIG. 2B illustrates an example of a user interface that may be displayed to a remote user during a collaboration session illustrated in FIG. 2A.

FIG. 2B illustrates an example of a user interface (UI) 250 that may displayed to a remote device 208 used by a remote user during a collaboration session illustrated in FIG. 2A. The UI 250 illustrates that, during the collaboration session, anchored AR overlays can be displayed at a remote device 208 of a worker and remote users 206A-206N. An application implemented at the device of the remote user receives the data to be displayed. The application can be a web browser, a cloud, or some other virtual sharing device.

The UI 250 illustrates a virtual collaboration room. An area 252 of the UI 250 illustrates that another participant is in the room; namely, a frontline worker 254 (i.e., the worker who is the physical location and who is wearing the client device). The area 252 also illustrates that tracked spaces (named HARVESTER 01 and HARVESTER 02) of the physical location are available for loading in an AR area 256. The area 252 may allow the frontline worker 254 to connect with other workers (e.g., other users 206A-206B or a user of a remote device 208). Thus, for example, the frontline worker 254 may tag other workers using area 252. Area 252 may allow one user to add other users or workers in real time as needed so that the users may work together to solve a problem or resolve a problem. Once added by the area 252 the other workers or users may visualize an AR area 256.

The AR area 256 may begin with images or videos captured by a client device 202 (also marked as 102 on FIG. 1) worn by the frontline worker 254. The AR area 256 may allow for tags 258 to be added as annotations and/or augmentations 259 of the images or videos captured by the remote device 208. The AR area 256 may be changed back and forth in real time so that changes may be made, removed, and then added back to the AR area 256. The AR area 256 may demonstrate which individual added the tags 258 and/or annotations 259. Each individual may have a different color, font, shape, area, tag, or combination thereof so that the annotations 259 may be identified by individual. The AR area 256 may allow the frontline worker 254 to select different individuals and display only annotations from selected individuals. For example, if the frontline worker 254 tries an idea and the idea does not fix the issue then the frontline worker 254 may remove that annotation 259 or that user's annotations from the AR area 256 so that other annotations 259 may be highlighted.

The tags 258 illustrate examples of augmentations made to the physical environment as imaged by the client device of the remote worker. The tags 258 may be annotations 259 made to a specific part. The tags 258 may illustrate which individual made a particular annotation 259. For example, each individual listed in area 252 may be provided with a different color, font, style, shape, icon, symbol, or a combination thereof so that the annotations 259 may illustrate who made an annotation 259. Thus, for example, a first annotation 259, from a first individual may note that the "threads of the bolts should go beyond the nuts." The second annotation 259, from a second individual may note "bolt missing." The second annotation 259 is bold relative to the font of the first annotation 259 illustrating that these two annotations 259 were made by two different individuals. These annotations 259 illustrate an example of an instruction or note added by an individual (e.g., the worker or a remote user). The annotations 259 are added as an augmentation in the AR area 256.

One or more commands 260 may be available to the remote user. An individual such as a remote user may use the commands 260 to control the device remotely. The one or more commands 260 may be a plurality of different commands 260 or abilities provided to individuals other than the frontline worker. The commands 260 may allow individuals to zoom, pan, tilt, switch camera functions (e.g., thermal, night, infrared), or a combination thereof when viewing an object of interest. The commands 260 may activate audio between the frontline worker 254 and other individuals (e.g., trainers, other workers, supervisors). The commands 260 may be pre-configured commands that may be provided to the frontline worker 254 based on prior events. For example, if a part of a machine has previously broken and been fixed or replaced, the prior session may be stored. The stored session may be automatically displayed upon the device viewing the part of the machine. The frontline worker 254 may then be provided the steps previously taken to repair and/or replace the part of the machine. The commands 260 may be performed using buttons, switches, arrows, a joystick, or a combination thereof in communication with the device 102. The commands 260 may facilitate communication between the frontline worker 254 and other workers. The commands 260 may assist in providing the tags 258, the annotations 259, or both. The commands 260 may include AR commands 262.

The AR commands 262 may be used by individuals (e.g., the remote users, trainers, instructors, other workers) to add overlays (e.g., new overlays in addition to the pre-existing overlays) that are anchored on the visual data (e.g., a live video stream from the client device) and displayed in the AR area 256. The AR commands 262 may include stickers (e.g., a predetermined visual graphics) that direct the frontline worker 254 to perform a task or look at a region or object. The AR commands 262 may include annotations or notes that overlay a portion of a captured image. The AR commands 262 may be visible when the device 102 is directed at an object of interest. To illustrate, if an object of interest is located in the middle of a machine and the user is looking at a left side of the machine, no AR commands 262 may be visible. When the frontline worker 254 wearing the device 102 looks at the center of the machine, the AR commands 262 may become visible so that the frontline worker 254 can follow (e.g., perform) the AR commands 262. The AR commands 262 may be a predefined selection that is added via one or more buttons 268. The buttons 268 may be part of a keyboard, arrows, a mouse, or a combination thereof that permit AR commands 262 to be added, subtracted, moved, changed, or a combination thereof. The AR commands 262 may be added in any language and then changed to other languages automatically by actuating a language type in the area 264.

In an example, session transcription and translation may be provided in the UI 250. In an area 264, the remote user may indicate a source language (e.g., English) that is spoken by the worker and target language (e.g., French) of the remote user. In an area 266, translations and/or transcriptions are shown. For example, a French speaker in the collaboration session may ask "Do you see the tax instruction?," which the remote server may translate to and display as "Voyez-vous l'instruction fiscal?" The languages selected in area 266 may be virtually any language. Languages may be added into area 266 as desired. Languages in area 266 may be removed if not needed. The languages in area 266 may be stored on the remote server 104 and processed on the remote server 104 and provided to the device 102.

Figure 3B:
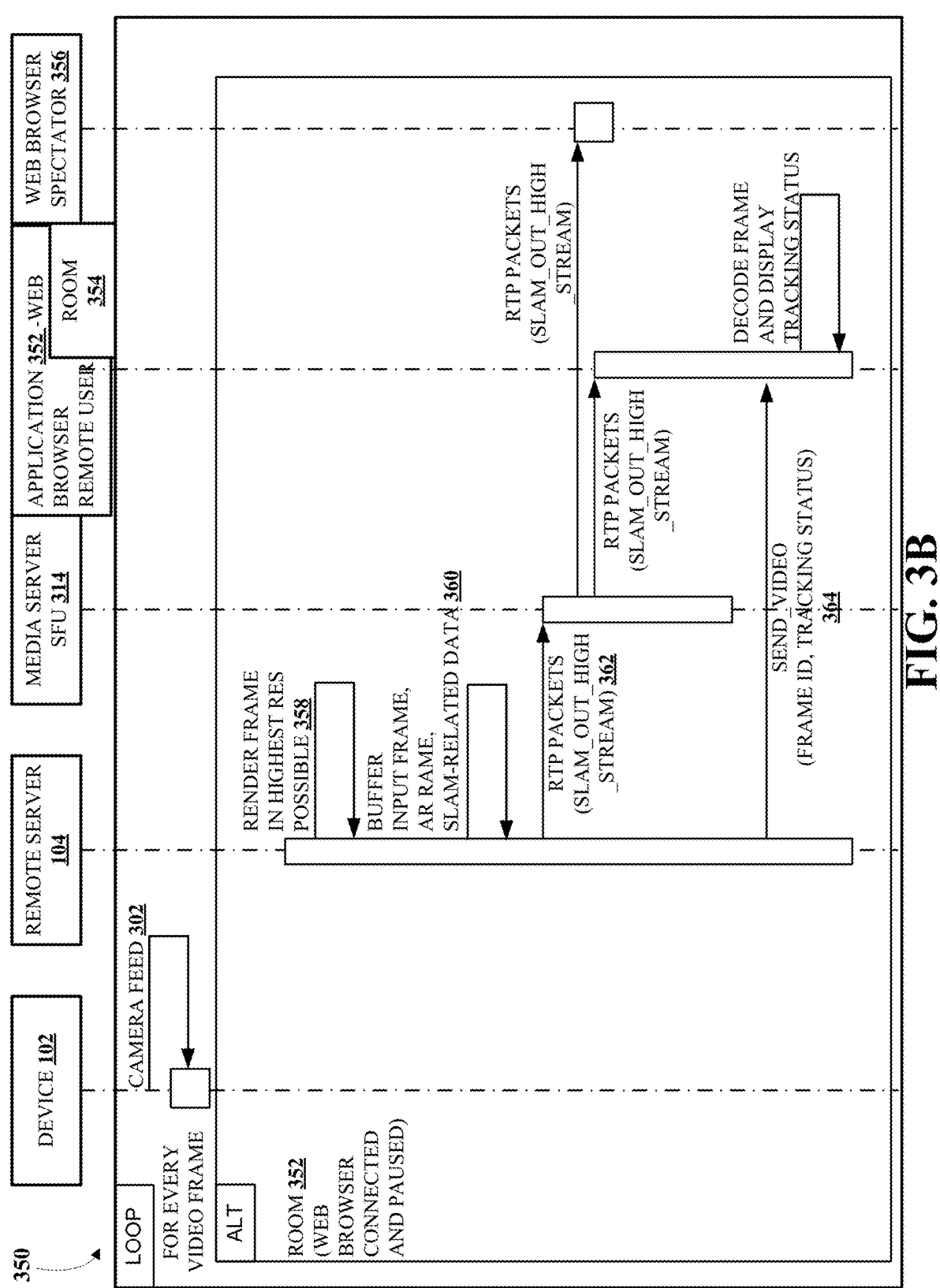
FIG. 3B is a sequence diagram of interactions between a SLAM server and remote devices.

Remote SLAM computations and propagation of AR content is now described with respect to FIGS. 3A and 3B. FIG. 3A is a sequence diagram 300 of interactions between a device (e.g., 102) and a remote server (e.g., 104). FIG. 3B is a sequence diagram 350 of interactions between a remote server 104, a media server 314 (which may be or include a selective forwarding unit (SFU)), and remote devices. The sequence diagram 350 can be a continuation of the sequence diagram of 300 of FIG. 3A. Thus, the teachings as to the sequence diagram of 300 of FIG. 3A are incorporated herein.

A user, using a device 102 (e.g., binocular device, monocular device (head-mounted or handheld)), may be logged into a room 354 (which is a virtual collaborative space and may be called alternatively as i.e.: space, area, section, folder etc.) within the device's client application 352. The device 102 (i.e., the client application 352 therein) is communicatively and remotely connected to remote server 104. A map storage location may be loaded in the client application 352 based upon prior sessions or external information.

After logging into the virtual room 354 located within the application 352 a user may select an existing (or creates a new) map. The device 102 receives information on the device's screen about the current state of tracking of the physical location that the user (and the device) are located in. If the tracking is active (relocation on a loaded map or initialization on a newly created map), the user sees on the device screen AR overlays (augmentations) that have been anchored, as analyzed data 318, to the elements of the physical environment and are visible in the current camera pose (estimated for current video frame). In the case of loss of tracking for the currently displayed video frame, the loss can be signaled to the user and the overlays are not displayed on the screen.

To initialize or keep tracking, a camera feed 302 captured by the camera of the device 102 can be continuously streamed to a remote server 104 (i.e., a SLAM Server). In real-time, points in the video feed are recognized as belonging to a real-world object and tracked from frame to frame. The remote server 104 can generate a local three-dimensional (3D) coordinate system from the two-dimensional (2D) video and can estimate a camera pose of the camera of the device 102.

Once the remote server 104 begins tracking, positions of real-world objects captured via a camera of the device 102, objects can be recognized and identified even though the field of view and position of a camera of the device 102 as a location of the device 102 is changing by the user moving around.

Video streaming can be implemented in at least two modes: a limited bandwidth mode 306 or a regular mode 310. In the limited bandwidth mode 306, the amount of data transmitted between the device 102 and the remote server 104 is reduced as compared to the transmission in the regular mode 310. The limited bandwidth mode 306 can be implemented to be resistant to large and irregular delays in the transmission of video frames and metadata between the device 102 and the remote server 104.

The limited bandwidth mode 306 is now described. The device 102 encodes a video frame in its native size of the display (this is a way to limit the bandwidth needed). In an example, a video codec (e.g., an H.264 or VP8 codec or others) may be used. The encoded images may be transmitted to the remote server 104 using a proprietary protocol (further described herein) that is based on Transmission Control Protocol (TCP) communication. The raw form of the video frame can be stored, at 303, in a buffer of the device 102. The buffer size can be sufficient to store 30 video frames or more, 60 video frames or more, 90 video frames or more. However, other buffer sizes are possible. The buffer may store 10 seconds or more, 30 seconds or more 60 seconds or more, or even 90 seconds or more of images or video footage. The buffer may store 30 minutes or less, 20 minutes or less, or 10 minutes or less of images or video footage. A respective identifier (ID) may be associated in the buffer with each frame. The ID of a frame can be transmitted to the remote server 104 along with the encoded frame. In an example, the identifier of a frame can be a 64-bit representation of the frame creation time at the device 102. However, other identifiers are possible. The buffer can be a circular buffer that operates as a first-in-first-out (FIFO) buffer where the oldest frame is replaced by a newest frame received from the camera of the device.

The remote server 104 processes, at 305, a received frame using SLAM algorithms. The resulting data (e.g., server data 304) can be sent as a response to the monocular device. The response can contain data of the camera pose, waypoints (which may also be referred to as landmarks in SLAM parlance), positions of overlays visible in a given frame and the ID of the video frame for which the data is correct. Based on the response received from the remote server 104, the device 102 checks in the buffer whether the frame with the given identifier is still present. If the video frame is not in the buffer, the data is skipped (i.e., ignored, not processed, etc.). If the frame is present, the frame can be loaded from the buffer and the overlays are rendered, at 307, on the frame based on information from the remote server 104. The frame can be displayed on a screen of the device 102. In this way, the amount of data needed to propagate AR content is significantly reduced (e.g., in the limited bandwidth mode 306) as compared to a full server-side implementation of remote rendering of augmented video stream (e.g., in the regular mode 310). By operating on frame identifiers, resistance to variable interval time between frames is also assured.

Using frame identifiers, the device 102 can measure the total time required to obtain the information needed to render the frame with AR overlays. On this basis, the device 102 can dynamically adjust the number of frames and bitrates sent to the remote server 104 to provide to remote server 104 in conditions of very limited bandwidth.

The regular mode 310 is now described. In the regular mode 310, the video stream from the device 102 can be delivered, at 312, to the remote server 104 via the media server 314 in the form of Real-time Transport Protocol (RTP) packets. The media server 314 receives RTP packets and in turn transmits them to the remote server 104. The media server 314 may be a server within the remote server 104. The media server 314 may be a discrete server that is different than from the remote server 104. The media server 314 may be an intermediary between the device 102 and the remote server 104. In an implementation, Web Real-Time Communication (WebRTC) may be used to transmit the packets (e.g., frames, data, audio, videos). However, other implementations or protocols are possible.

The media server 314 serves several purposes. The media server 314 can stream a video stream (a monocular video stream) received from the device 102 to a remote user therewith enabling the remote user to anchor AR annotations either on a live or paused video. This process is significant as it marks the transition from video coordinates ([x1,y1]) to the 3D world of the user device 102. Once an AR annotation is placed and anchored, the video stream is enhanced with these annotations. The augmented video stream can be streamed back to the device 102 in high quality, provided the bandwidth settings are sufficient. In cases of low bandwidth, and to conserve data, the annotations are rendered directly at the device 102 atop the raw video obtained via the camera of the device 102 therewith eliminating the need for the media server 314 to send back video frames. Instead, only the SLAM server communicates back the coordinates calculated for the AR annotations.

Additionally, the media server 314 is responsible for broadcasting the augmented video stream to remote users and spectators, irrespective of the video protocol used to source video from the device 102. The media server 314 also manages the audio communication between various parties involved, including the wearer of the device 102, remote users, and spectators.

At 317, the remote server 104 submits received frames of the video stream to SLAM algorithms therein for processing. Output data from the SLAM algorithms (e.g., camera pose, waypoints, information about AR overlays that are visible in a given pose) are applied to the corresponding video frame to be rendered with the overlays to obtain a resulting frame. The resulting frame can be encoded and transmitted, such as via an application 352 web browser (e.g., the WebRTC session), back to the device 102. Contemporaneously, information about the status of space tracking and the focused overlay (described below) located is sent. The device 102, receiving a video frame at 320, displays it, at 322, to the user on a display of the device 102. An indicator may also be displayed informing the user about the status of tracking in the space corresponding to the current frame. The received video frame includes tracking data.

The tracking data 322 may include a location of an object of interest within a map, a three-dimensional space, or both. The tracking data may include information that may overlay raw images or raw video. The tracking data may include annotations from one or more remote users (e.g., other workers, trainers, supervisors, experts, or a combination thereof). The tracking data may include information from SLAM. The tracking data may include drawings, writings, arrows, labels, commands, suggestions, or a combination thereof provided from others to a frontline worker 254. When the tracking data is provided to the device 102, the frontline worker 254 may then perform a task in real time. For example, the frontline worker 254 may perform some task in real time while others provide suggestions on how to fulfil the task. Thus, the frontline worker 254 wearing the device 102 may be provided virtual instructions or suggestions from remote people so that the frontline worker may complete the task without having to leave the location.

The application 352 of FIG. 3B may be web-based, cloud based, server based, based on a local server, located on a near net communication device that is accessible only over a predetermined area, or a combination thereof. The application 352 may be loaded on any device, connect to any device, or both that connect to the internet via any form of communication (e.g., Wi-Fi, phone connection, wireless) so that the application 352 may communicate to a remote user. The application 352 may have rooms 354 (i.e., virtual rooms).

The rooms 354 may allow multiple users to connect to the application 352. The rooms may allow a plurality of different frontline workers 254 to connect to the application 352 and to one or more rooms of the application 352. For example, a first frontline user using a first device may open a first room and a second frontline user using a second device may open a second room. An individual such as a spectator 356 may connect to the application 352. The spectator 356 may move between the first room and second room to provide recommendations and/or advice to the frontline workers as their work progresses. Generally, the spectator 356 is a passive role able to observe video stream with or without augmentations, read real-time transcriptions/translations and speak with other participants. However, the spectator 356 may be promoted to a full assistant mode of remote user 352 who may fast forward, rewind, stop, pause, zoom, pan, tilt, or a combination thereof the videos in real time or after the videos are collected so that the spectator 356 may alternate between different rooms 354 without missing any changes or images from the devices 102. The rooms 354 may allow multiple different users with multiple different devices 102 to build a repository while experiencing issues so that when a spectator 356 becomes available, the spectator 356 may join the room and provide feedback.

The spectator 356 may be in communication with the application 352, the room 354, or both by a phone, computer, tablet, television, or a combination thereof. The spectator 356 may watch videos or images being taken by the frontline worker. The spectator 356 may watch the recording of the room 354 until the spectator 356 is caught up to real time. The spectator 356 may watch until the frontline worker indicates that input is needed. The spectator 356 may provide feedback in real time. The spectator 356 may provide annotations, notes, feedback, or a combination thereof to the frontline worker. The spectator 356 may provide audio (e.g., speak) with the frontline worker. The spectator 356 may communicate through the application 352 so that conversations may be had, information may be requested, or both.

"Status of space tracking" indicates a condition of spatial tracking, which may be associated or indicated with a color value such as white, red, yellow, or green. The value "white" can indicate that the SLAM algorithm was not able to track for a given frame; the value "red" may indicate that a number of identified waypoints (e.g., a location of interest) for a given frame is less than or equal to a first threshold number (e.g., 50); the value "yellow" may indicate that a number of identified waypoints for a given frame is less than or equal a second threshold number (e.g., 150); and the value "green" may indicate that a number of identified waypoints for a given frame is greater than the second threshold number. Other statuses of tracking and threshold numbers are possible.

"Focused overlay" means or refers to an AR label/overlay that is selected by a user. Selection (due to the nature of wearable devices) may be accomplished by detecting whether there is currently an overlay in the frame (e.g., a central region of a frame). In an example, a "gaze" icon may be displayed in the center of the screen. The AR overlay can be selected when the position of the gaze icon coincides with the position AR overlay (to within a configurable tolerance). The gaze icon when selected may add or remove the AR overlay from the images. The selected state of the overlay can be maintained for a short, configurable time to maintain a certain inertia, which increases the user's comfort (such as to eliminate situations when the user loses focus on the selected overlay due to head movement while speaking a voice command. When an overlay is selected, actions (e.g., commands) may become available to the user. Examples of actions include delete, attach file, open file, add sensor, and so on.

Selection/focus can be calculated based on the projection of the overlay position in a given frame for the estimated camera position: On monocular devices in case of low bandwidth connection (based on the positions of all waypoints received from the remote server; and fully on the remote server for good bandwidth conditions and sent as an additional message with complete information about the selected overlay (its type, data such as attachment, text).

Referring to FIG. 3B, if a remote user joins a room 354 in an application 352 (e.g., a SLAM session) via a web browser, such as illustrated with respect to FIG. 2B, an augmented image may be displayed on a device of the remote user in a UI that includes UI controls that the remote user can use to, for example, place overlays on the live video feed and/or to freeze on a selected frame for a precise anchoring of overlays or for an inspection of a given frame of the video regardless. Freezing the video stream at the remote device neither freezes the video at the device 102 (e.g., monocular device) nor is it affected by the movements of the device (i.e., by the changes to the field of view of the camera of the monocular device). A remote user 352 or spectator 356 may manipulate videos while additional videos are being created without the frontline worker knowing that the remote user 352 or spectator 356 is further analyzing the videos.

The video stream for the web browser (if it participates in the SLAM session) is always generated in the same way, regardless of the connection mode used. The transfer can be performed using the RTP stream in the WebRTC implementation. The stream can have relatively constant inter-frame spacing. As such, instructions to add AR overlays can be executed with good accuracy without the use of additional synchronization mechanisms.

The video stream for the web browser can be independent of the processing for the device in the sense that if processing is done for the device, the circular buffer is fed to the browser. The browser user can stop the stream at any time, which downloads the indicated frame from the buffer (a SEND_VIDEO message sends the current video frame identifier and tracking status).

In an implementation, the buffer may have a capacity of 30 frames (or any other capacity discussed herein). If the requested frame is not in the buffer, the latest available frame (i.e., the more recently added frame) is selected. The frame downloaded from the buffer is sent back to the browser, which results in a full synchronization of the frame on the remote server with what the web browser user is currently seeing. In this way, precise insertion of AR overlays is possible. This does not stop frame/stream processing for the monocular device.

However, all web browser streams are paused (a common buffer for all web browsers is used) in this SLAM connection (it is possible to invite users to SLAM session in spectator mode). The spectator mode may be a mode where the frontline worker is not requesting assistance and another user may enter and exit a room to monitor status. The spectator mode may indicate that feedback is not being requested, but the frontline worker believes that difficulties may be ensuing. The spectator mode may be switched to an assistance mode if the frontline worker experiences difficulties, is requesting help, or both. The assistant mode may open communications, alert the spectator 356 that help is requested, or both. The buffer holds snapshots of camera poses, waypoints, AR overlays, original video frame, and augmented frame.

As such, with reference to FIG. 3B, the remote server 104 may receive the camera feed 302. The remote server renders, at 358, high resolution frames including virtual renderings, augmented renderings, and/or other SLAM-related data. The high-resolution frames are buffered, at 360, for transmission to application 352 and/or spectator 356. At 362, RTP packets of the buffered frames are transmitted to the application 352 and/or spectator 356 via the media server 314. SEND_VIDEO messages are sent, at 364, from the remote server 104 to the application 352.

Table I illustrates a protocol frame for communicating between a device and a remote server. As already mentioned, the communication between use TCP sockets and a custom protocol at application level. DATA field can hold every message described for communication between the device and the remote server. The field PREAMBLE can include a constant value that identifies the start of the frame. The field DATA SIZE can indicate the size of the DATA field size. The field DATA can hold any data. The size of the DATA field is specified in the DATA SIZE field. The field MESSAGE END can be a constant value that indicates the end of a frame.

TABLE I

| FIELD NAME | PREAMBLE | DATA SIZE | DATA | MESSAGE END |
|---|---|---|---|---|
| FIELD SIZE | 1 byte | 4 bytes | DATA SIZE bytes | 4 bytes |
| VALUE | 0xCC | | | 0xCC, 0xCD, 0xAA, 0xAA |

Table II describes the message structure of the SEND_VIDEO message shown in FIGS. 3A and 3B. The field START MARKER can be a constant value that identifies the start of the message. The field ACTION ID can identify the type of payload data that is included in is field that follows the DATA SIZE field. The field FRAME TIME includes the timestamp of the video frame. The field VIDEO DATA includes an encoded video frame (such as a frame encoded using H.264).

TABLE II

| | SEND_VIDEO | | | | |
|---|---|---|---|---|---|
| FIELD NAME | START MARKER | ACTION ID | DATA SIZE | FRAME TIME | VIDEO DATA |
| FIELD SIZE | 1 byte | 1 byte | 2 bytes | 8 bytes | Frame's DATA SIZE - 4 bytes |
| DEFAULT VALUE | 0xCC | 3 | Not used | | |

Table III describes the message structure of the SERVER_DATA message shown in FIGS. 3A and 3B. The field ACTION ID can be used to indicate the kind of payload that is present or required in the next field. The VIDEO FRAME DATA field can include compressed (such as using GZIP or some other compression algorithm) application specific structure of data for a single video frame processed by the SLAM Server.

TABLE III

| | SERVER_DATA | |
|---|---|---|
| FIELD NAME | ACTION ID | VIDEO FRAME DATA |
| FIELD SIZE | 1 byte | Variable length |
| VALUE | 5 | Compressed FRAME DATA structure |

Table IV describes the structure is described of the VIDEO FRAME DATA field of the SERVER_DATA message.

| Field name | Frame time | Camera position | Camera rotation | Camera position inv | Camera rotation inv | Way-points size | Way-points | Markers |
|---|---|---|---|---|---|---|---|---|
| FIELD SIZE | 8 bytes | 24 bytes | 72 bytes | 24 bytes | 72 bytes | 4 bytes | Way-point size bytes | Variable length |
| Comment | | | | | | | 24 bytes per Way-point | |

A technique (which may use or include a SLAM algorithm) for anchoring of AR content in a 3-dimensional coordinate system on top of a 2-dimensional video is now described. The technique can be implemented, for example, as a software program that may be executed by computing devices such as a SLAM server. The software program can include machine-readable instructions that may be stored in a memory, and that, when executed by a processor may cause the computing device to perform the technique. The technique can be implemented using specialized hardware or firmware. Multiple processors, memories, or both, may be used.

The 2-dimensional video can be obtained from a client device (e.g., monocular device) that may be worn or carried by a user. The user can be logged into a room of an application, on a web browser, or both within an available at or executing at the client device. The device is connected to the remote server. A map storage location may be loaded in the client application and SLAM tracking is active. A map when located within the client application may indicate the location of the user within the map. In some examples, a remote user may additionally be connected to the SLAM server via a remote device, as described with respect to FIGS. 3A and 3B.

A command may be received to add an AR overlay. The command may be received from the client device 102, the remote device 352, or both. The command may include a target pixel in a video frame at which location the AR overlay is to be added. The video frame is a frame of a video stream received at the SLAM server from the client device and captured by a camera of the client device. The coordinates from the 2D image plane (i.e., video frame) can be used to anchor the AR overlay in the digital 3D coordinate system of the map of the real-world. That is, the 2D image coordinates are converted to a 3D (x, y, z) coordinate in the physical world.

By embedding the overlay as a 3D object in the map, it becomes possible to perform precise positioning of the AR overlay (such as "pinning" an AR marker to a button, wall, equipment element, or the like); and becomes certain that the AR marker can be correctly drawn on top of the corresponding physical item, regardless of the position and rotation of the monocular device camera.

The (x, y) coordinates can be determined from the geometric relationships between the projection of the marker in the camera image (i.e. the pixel selected in the image) and the camera pose estimated by the SLAM algorithm. The z coordinate indicates how far from the device camera the AR overlay should be placed. In other words, the z coordinate indicates how "deep" in the image the AR overlay should be placed. The z coordinate (i.e., the depth) can be calculated using information from the cloud of waypoints located in the 3D map and determined during the operation of the SLAM algorithm.

For any point in the camera image with (x, y) coordinates, the SLAM algorithm searches for all waypoints with respective 2D projections on the image is inside a circle with a given radius r and centered at (x, y). As a result of this operation, the SLAM algorithm receives a set of waypoints whose location in 3D space are already known (i.e., calculated by the SLAM algorithm). These waypoints can be assumed to be sufficiently close to the sought AR overlay location and that their z coordinates will be close to the sought AR overlay z coordinate. The more waypoints that are selected and the closer the waypoints are to the searched location, the smaller the estimation error may be relative to the SLAM.

An overlay is not necessarily anchored to the place where a waypoint is actually identified (e.g., found, calculated) by the SLAM algorithm. Rather, an overlay is anchored to a physical object or a fragment thereof in the vicinity of which several waypoints were identified. The spatial data structures (e.g., 3D map and overlays and attachments that these overlays are anchored to) are preserved (e.g., saved or persisted). and may be provided to individuals such as third parties to the real-time view (mentor/spectators) for remote AR collaboration.

Each frame on which there was/is tracking has a non-empty set of waypoints (i.e., there are more than zero waypoints). In adding an overlay to the frame, the depth can be calculated based on the subsets in the radius in a configurable number of steps (in each step the radius is increased by a configurable ratio). The radius size and the ratio of increase can be configurable and can be adjusted for the best results in a given industrial space (e.g. large objects with large flat surfaces vs. printed circuit boards (PCBs) with many elements).

Each waypoint can be assigned a weight based on a distance of an object from the desired AR overlay location. Closer waypoints can be given higher weights than farther waypoints. Coordinates for AR overlay can be estimated as a weighted average of the coordinate values from the previously selected waypoints. The AR overlay can be placed at the depth expected by the user, if there is a sufficiently large number of waypoints in the vicinity of the selected pixel on the video frame.

Figure 4:
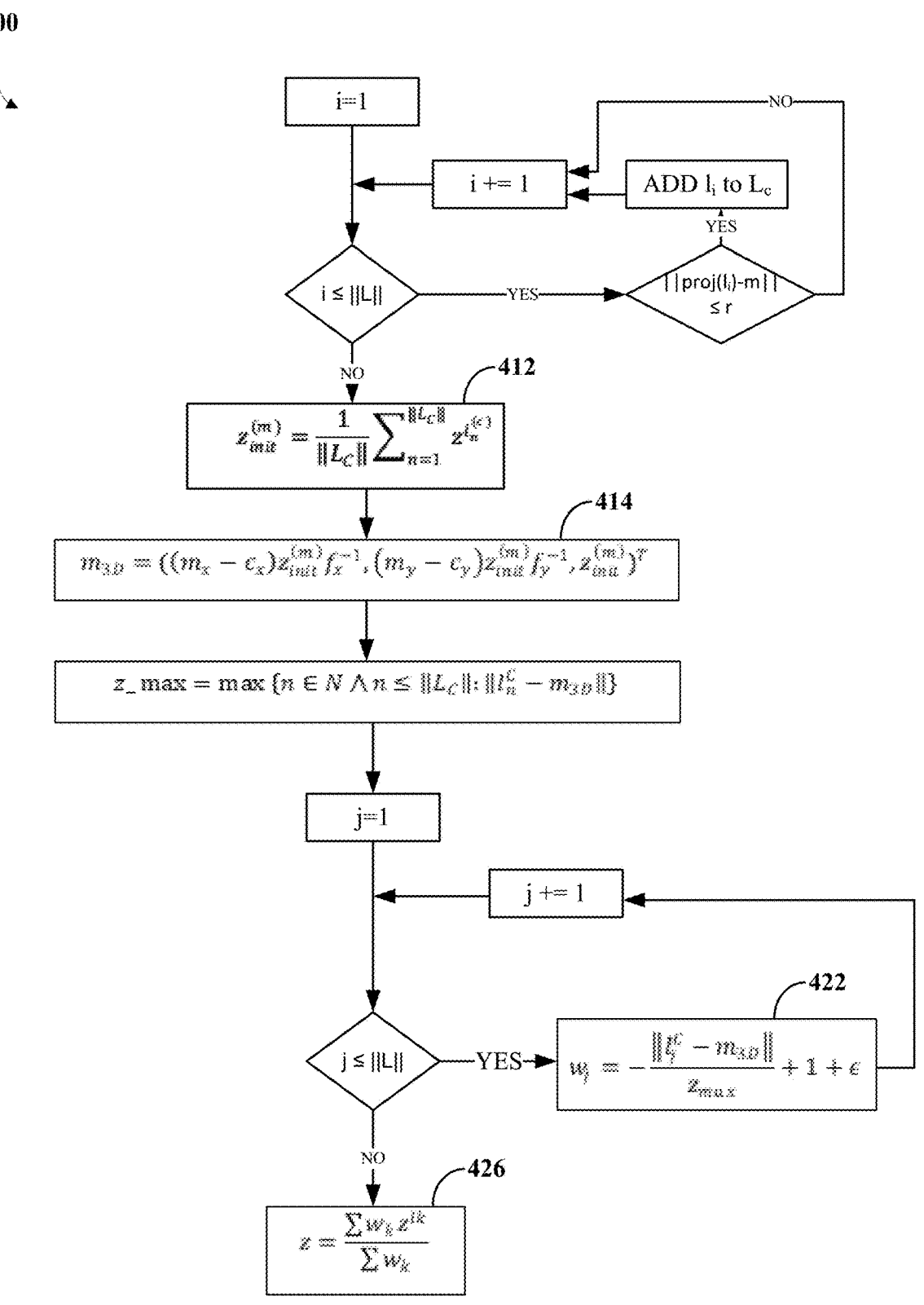
FIG. 4 is an example of a technique for calculating the z coordinate of an AR overlay.

FIG. 4 is a flowchart of an example of a technique 400 for calculating the z coordinate of an AR overlay. At the beginning, the technique determines a set $L_C$ of all candidate waypoints that are to be used to estimate the depth of an AR overlay. At 412, an initial value of depth $$z_{init}^{(m)},$$

can be calculated as an arithmetic average from the depth coordinates taken from waypoints (of the set LC) that are adjacent to the to-be-anchored AR overlay.

At 414, an $m_{3D}$ value can be determined using the formula for the 3D coordinates of a point in space recorded by the camera modeled by the pinhole camera mode. At 422, the weights for the weighted average are calculated. The weights are constructed so that the nth waypoint $$l_n^{(C)}.$$

That is, waypoints close to the AR overlay can be assigned higher weights than those that are farther away. Additionally, the weights can be normalized to the range $[\epsilon, 1+\epsilon]$. It is noted that a small value of $\epsilon$ can be added to the result to protect against division by 0. At 426, the weighted average of the coordinates from the waypoints is computed.

FIG. 5 illustrates the technique 500. At 502, a request to add an overlay at a pixel located at (x, y) coordinates is received. The overlay is added at a pixel located at (x, y) coordinates in one or more images. The overlay may be added at a location that aligns with one or more objects of interest. Once the overlay request is received waypoints are identified 504.

At 504, waypoints are identified within a three-dimensional space. The waypoints are identified within the three-dimensional space with respect to two-dimensional projections. The two-dimensional projections fall inside a circle with a given radius R and centered at (x, y). At 506, an overlay z-coordinate is determined for the overlay as a weighted sum of respective coordinates of the waypoints. The z-coordinate for the overlay can be determined as a weighted sum of respective z-coordinates of the waypoints. Once the Z-coordinate is determined, the overlay is assigned to a location (x, y, overlay z-coordinate), at 508. The overlay may be locked at the location.

FIG. 6 illustrates the technique 600. The technique 600 begins by transmitting images 602. At 602, images are transmitted from a user device to a server. The images are transmitted as an encoded video frames of a video captured by a camera of the device. The images may be transmitted wirelessly or otherwise. The images are received from the device at the server 604.

At 604, data including a camera pose, waypoints, data related to augmented reality overlays that are visible given the camera pose are received at the user device and from the server. At 606, the augmented reality overlays are overlayed, at the user device, over the video frame to obtain an augmented reality frame. The data may be configured as an overlay and the overlay may be applied over images within the video frame of the user device. The overlays generate an augmented reality frame that can be displayed or stored at the user device, at 608.

For simplicity of explanation, the techniques 500 and 600 of FIGS. 5 and 6 are each depicted and described as a respective series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The present teachings provide a methos method that includes receiving a request to add an overlay at a pixel located at (x, y) coordinates in images. Identifying waypoints in a three-dimensional space with respective two-dimensional projections onto the images falling inside a circle with a given radius r and centered at (x, y). Determining an overlay z-coordinate for the overlay as a weighted sum of respective z coordinates of the waypoints. Assigning the overlay a location (x, y, overlay z-coordinate).

The present teachings may further include: providing the overlay to a device so that that overlay is visible on the device. Requesting log in information for a remote device so that the remote device is able to display the overlay, wherein the remote device connects to a web browser so that the overlay is capable of being remotely shared with one or more remote device. Identifying waypoints further comprises filtering waypoints based on their relevance to a predefined context associated with the overlay. The overlay is generated on a remote server from the image generated on the device. The identifying of the waypoints include simultaneous localization and mapping (SLAM) of the images. The overlay includes interactive elements that respond to a user input. The SLAM of the images are outputted to a web browser so that the SLAM of the images are accessible by one or more remote device.

The present teachings provide: a method including transmitting, from a user device and to a server, an encoded video frame of a video captured by a camera of the user device. Receiving, at the user device and from the server, data comprising a camera pose, waypoints, data related to augmented reality overlays that are visible given the camera pose. Overlaying, at the user device, the augmented reality overlays over the video frame to obtain an augmented reality frame or receiving an augmented reality frame from the server. Displaying or storing the augmented reality frame at the user device.

The present teachings may further provide: transmitting the augmented reality frame to a media server, a web browser, a client device or both. Requesting log in information so that one or more remote users are connectable to the web browser. Generating the augmented reality frame on the server with a regular mode. The augmented reality frame is formed as a tag or an annotation on the video frame. The tag or the annotations are pinned to a physical location located within the video frame. Automatically generating the tag or the annotation when the physical location is captured by an imaging device of the user device.

The present teachings provide: a system including a device and a server. The device is configured to be worn by a user, the device configured to: capture frames or images and transmit the frames or the images. The server in communication with the device, the server comprising a processor configured to: receive the frames or the images; process the frames or the images to generate simultaneous location and mapping (SLAM) information related to the frames or the images; overlay augmented reality overlays over the frames or the images; and transmitting the overlays to the device to be displayed to the user.

The present teachings may further provide: a web browser in communication with the server so that the overlays may be viewed remotely by one or more remote devices. The device comprises: a camera, speakers, and a microphone so that audio and video can be shared between the device and the server. The server stores historical data and automatically displays the historical data upon a previously captured image being viewed by the device. The historical data is saved as a waypoint such that when the device arrives at the waypoint the historical data is automatically displayed.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of a client device, a remote server, and/or any of the components therein and the techniques, algorithms, methods, instructions, etc., stored thereon and/or executed thereby can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
receiving a request to add an overlay at a pixel located at (x, y) coordinates in images;
identifying waypoints in a three-dimensional space with respective two-dimensional projections onto the images falling inside a circle with a given radius r and centered at (x, y);
determining an overlay z-coordinate for the overlay as a weighted sum of respective z coordinates of the waypoints; and
assigning the overlay a location (x, y, overlay z-coordinate).

2. The method of claim 1, further comprising:
providing the overlay to a device so that that overlay is visible on the device.

3. The method of claim 2, further comprising:
requesting log in information for a remote device so that the remote device is able to display the overlay, wherein the remote device connects to a web browser so that the overlay is capable of being remotely shared with one or more remote device.

4. The method of claim 2, wherein the overlay is generated on a remote server from the image generated on the device.

5. The method of claim 2, wherein the overlay includes interactive elements that respond to a user input.

6. The method of claim 1, wherein identifying waypoints further comprises filtering waypoints based on their relevance to a predefined context associated with the overlay.

7. The method of claim 1, wherein the identifying of the waypoints include simultaneous localization and mapping (SLAM) of the images.

8. The method of claim 7, wherein the SLAM of the images are outputted to a web browser so that the SLAM of the images are accessible by one or more remote device.

9. A method, comprising:
transmitting, from a user device and to a server, an encoded video frame of a video captured by a camera of the user device;

receiving, at the user device and from the server, data comprising a camera pose, waypoints, and data related to augmented reality overlays that are visible given the camera pose;

overlaying, at the user device, the augmented reality overlays over the video frame to obtain an augmented reality frame or receiving an augmented reality frame from the server; and displaying or storing the augmented reality frame at the user device.

10. The method of claim 9, further comprising:
transmitting the augmented reality frame to a media server, a web browser, a client device or both.

11. The method of claim 10, further comprising:
requesting log in information so that one or more remote users are connectable to the web browser.

12. The method of claim 10, further comprising:
generating the augmented reality frame on the server with a regular mode.

13. The method of claim 9, wherein the augmented reality frame is formed as a tag or an annotation on the video frame.

14. The method of claim 13, wherein the tag or the annotations are pinned to a physical location located within the video frame.

15. The method of claim 14, further comprising:
automatically generating the tag or the annotation when the physical location is captured by an imaging device of the user device.

16. A system comprising:
a device configured to be worn by a user, the device configured to:
capture frames or images and
transmit the frames or the images;
a server in communication with the device, the server comprising a processor configured to:
receive the frames or the images;
process the frames or the images to generate simultaneous location and mapping (SLAM) information related to the frames or the images;
overlay augmented reality overlays over the frames or the images; and
transmitting the overlays to the device to be displayed to the user,
wherein the server stores historical data and automatically displays the historical data upon a previously captured image being viewed by the device and the historical data is saved as a waypoint such that when the device arrives at the waypoint the historical data is automatically displayed.

17. The system of claim 16, further comprising:
a web browser in communication with the server so that the overlays may be viewed remotely by one or more remote devices.

18. The system of claim 16, wherein the device comprises: a camera, speakers, and a microphone so that audio and video can be shared between the device and the server.

19. The system of claim 16, wherein the overlay is at a pixel located at (x, y) coordinates in the frames or the images.

20. The system of claim 16, wherein the overlay comprises an overlay z-coordinate for the overlay as a weighted sum of respective z coordinates of the waypoints.

* * * * *